Figure 1:
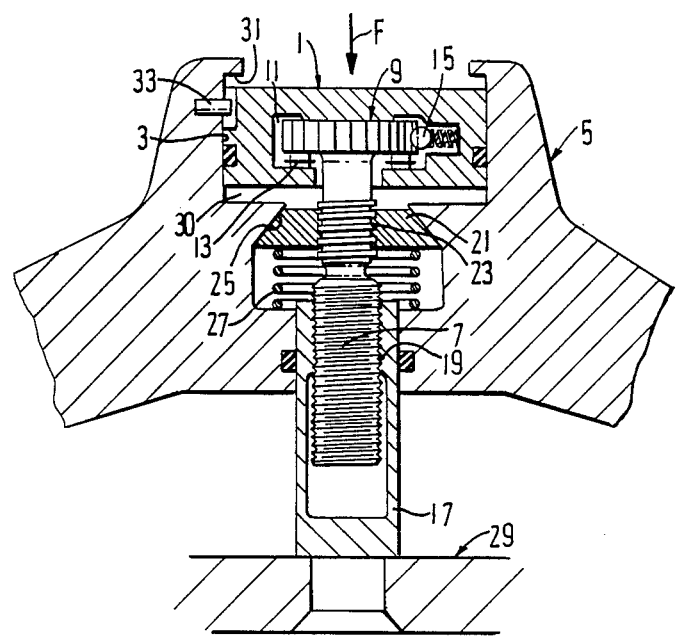

United States Patent [19]

Harrison

[11] Patent Number: 4,840,257
[45] Date of Patent: Jun. 20, 1989

[54] BRAKE ADJUSTERS

[75] Inventor: Anthony W. Harrison, Birmingham, England

[73] Assignee: Lucas Industries public limited company, Birmingham, England

[21] Appl. No.: 183,361

[22] Filed: Apr. 12, 1988

Related U.S. Application Data

[63] Continuation of Ser. No. 936,440, Dec. 1, 1986, abandoned.

[30] Foreign Application Priority Data

Nov. 29, 1985 [GB] United Kingdom ............... 8529473

[51] Int. Cl.$^4$ .............................................. F16D 65/56
[52] U.S. Cl. .................... 188/196 D; 92/13.8; 92/130 A; 188/170; 188/199; 188/202; 192/111 A
[58] Field of Search ................ 188/71.9, 170, 196 D, 188/196 BA, 202, 203, 199; 192/111 A; 92/130 A, 13.1, 13.7, 13.8

[56] References Cited

U.S. PATENT DOCUMENTS

| 3,592,299 | 7/1971 | Erdmann | 188/71.9 |
| 3,599,761 | 8/1971 | Schultz et al. | 188/196 D X |
| 3,746,133 | 7/1973 | Hauth | 188/71.9 X |
| 3,811,538 | 5/1974 | Farr | 188/196 D X |
| 3,891,067 | 6/1975 | Axelsson | 188/196 D |
| 3,944,027 | 3/1976 | Yamamoto | 188/170 X |
| 4,018,140 | 4/1977 | Engle | 92/130 A X |
| 4,351,422 | 9/1982 | Chaude | 188/170 |
| 4,361,078 | 11/1982 | Cape | 188/170 X |
| 4,385,548 | 5/1983 | Persson et al. | 188/196 D X |
| 4,548,301 | 10/1985 | Koshino et al. | 192/111 A X |
| 4,595,083 | 6/1986 | Mackenzie et al. | 188/196 D X |

FOREIGN PATENT DOCUMENTS 916516  1/1963  United Kingdom ........... 188/196 D

Primary Examiner—George E. A. Halvosa
Attorney, Agent, or Firm—Scrivener and Clarke

[57] ABSTRACT

A brake adjuster wherein a thrust block is axially slidable in a cylinder bore and rotatably connected to one of two screw threaded adjuster members which are themselves interconnected by a self-sustaining thread. In use a power spring acts on the thrust block to move it axially within the cylinder bore to apply pressure to a friction pad via the adjuster members. The brake may be released by applying hydraulic pressure to the thrust block, at which time one adjuster member is rotated via a clutch, when a predetermined clearance has been taken up, relative to the other to adjust for pad wear. No relative adjustment occurs during application of the brake under the action of the power spring.

9 Claims, 1 Drawing Sheet

BRAKE ADJUSTERS

This application is a continuation, of application Ser. No. 06/936,440, filed Dec. 1, 1986, abandoned.

DESCRIPTION

The present invention relates to an adjuster for use in a vehicle brake.

In particular the present invention relates to an adjuster primarily intended for use in hydraulically released spring applied disc brake calipers. However, the adjuster of the present invention may also be used with spring applied drum brakes and other sources of release energy.

The aim of the present invention is to provide an automatic adjuster which is simple and efficient in spring applied brakes.

According to the present invention there is provided an adjuster for use in spring applied vehicle brakes comprising a thrust block which is axially slidable in a cylinder bore, the thrust block being connected to one of two screw threaded adjuster members which are themselves interconnected by a self-sustaining thread.

In use, power spring means act on the thrust block to move the thrust block axially within the cylinder bore to apply pressure to a friction pad or lining, via the adjuster members. The brake can be released by any suitable means, e.g. hydraulic release pressure acting on the thrust block in the cylinder bore against said power spring means.

In a preferred embodiment of the present invention one adjuster member is rotatably connected to the thrust block, preferably with spring loaded detent means arranged to prevent accidental rotation of said one adjuster member relative to the thrust block. Said one adjuster member is elongate and is provided both with a self sustaining adjuster thread which engages another adjuster member i.e. a thimble or tappet, and a spiral drive thread nearer to the thrust block, the spiral drive ring thread engaging a drive ring which has a tapered outer periphery. This tapered outer periphery can engage under the action of a light spring, a complementary surface in said cylinder bore to form a cone clutch. The drive ring thread angle and the clutch angle are so determined that the drive ring will rotate said one adjuster member as it is moved axially under the action of release pressure applied to the thrust block. However, the threaded connection between the drive ring and said one adjuster member has a predetermined amount of clearance, such that the said one adjuster member may be moved axially to normally release the brake, without rotation occurring. However, when sufficient pad or lining wear has occurred and said clearance has been taken up, the said one adjuster member will rotate relative to the drive ring which is then held by the cone clutch as the brake is released, and relative to the thimble or tappet which is nonrotatably secured to the pad or lining, thus moving the thimble or tappet forwards to take up the pad wear. In this preferred embodiment the brake is released by introducing hydraulic fluid into the cylinder bore between the thrust block and the drive ring. When this hydraulic pressure is released to apply the brake, the thrust block and said one adjuster member move axially causing the cone clutch to be released when said thread clearance has been taken up. The drive ring can then rotate on said one adjuster member as the adjuster members are moved to apply the brake. Thus the adjuster members maintain their relative adjusted positions until pad wear is again sufficient to take up the clearance in the drive ring thread on brake release.

In a modified form of the preferred embodiment the drive ring/cone clutch is located in a recess in a piston in said cylinder bore. Thus, by applying hydraulic pressure between the thrust block and said piston, service brake release is achieved, and by applying pressure between the piston and body an auxiliary or parking brake release is achieved.

Figure 2:
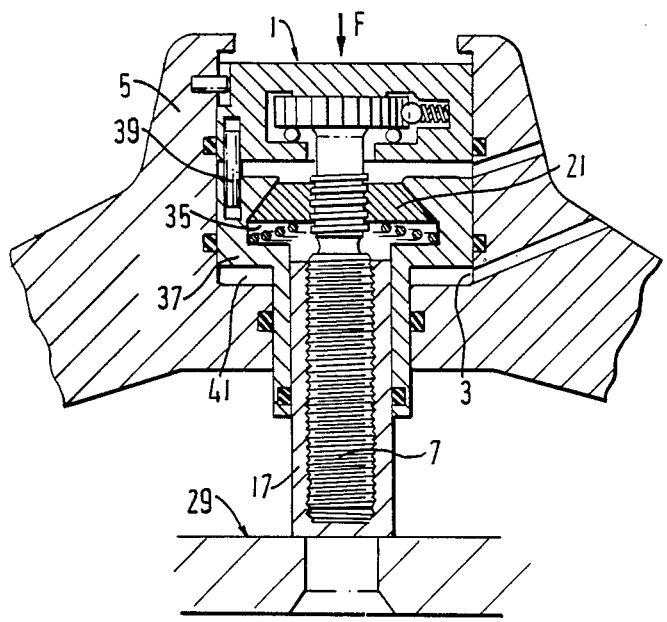

The present invention will now be further described, by way of example, with reference to the accompanying drawings, in which:

FIG. 1 is a schematic cross-sectional view of one embodiment of the present invention; and FIG. 2 is a schematic cross-sectional view of a further embodiment of the present invention.

The adjuster constructed in accordance with the present invention and illustrated in FIG. 1 of the accompanying drawings, is intended for use in hydraulically released spring applied, i.e. spring force F, disc brake calipers. The adjuster comprises a thrust block in the form of a piston 1 which is axially movable in a cylinder bore 3 in a brake caliper 5, under the action of spring force F and hydraulic pressure. The piston 1 is rotatably connected to one end region of an elongate adjuster member 7 by an enlarged diameter portion 9 of said adjuster member 7 being rotatably secured in a cavity 11 in the piston 1, a roller thrust bearing 13 allowing for easy rotation of adjuster member 7 on brake release. The outer periphery of the enlarged diameter portion 9 is profiled to engage with a spring loaded ball 15 or other detent means, to prevent accidental rotation of the adjuster member 7.

Said adjuster member 7 is screw threadedly connected both to a second adjuster member in the form of a thimble 17, by means of a self-sustaining thread 19, and to a disc-like drive ring 21 by means of a spiral drive ring thread 23. The periphery of the drive ring 21 is conically shaped to engage with a complementary surface 25 in the caliper 5 under the action of a spring 27, to thus form a cone clutch 21,25. The drive ring thread angle and the cone clutch angle are so designed that the adjuster member 7 can be rotated by the drive ring thread 23. Further, the drive ring thread 23 is provided with a predetermined amount of clearance so that a predetermined amount of axial movement is available for the adjuster member 7 before the thread is engaged; this clearance allowing for normal brake application without adjustment.

If, however, sufficient pad wear has occurred for this thread clearance to be taken up, then when the brake is released by forcing hydraulic fluid under pressure into the region 30 of the cylinder bore 3 to force the piston 1 back against the spring force F, the cone clutch 21,25 is forced into full engagement locking the drive ring 21 to the caliper body 5 so that further axial movement will turn the adjuster member 7 to lengthen the assembly 7 and 17; thimble 17 being non-rotatably secured to spreader plate 29. Pad wear is thus taken up. If, however, pad wear is insufficient for the thread clearance to be taken up then no adjustment occurs. To limit the axial movement of the piston 1 a shoulder 31 is provided in the cylinder bore 3 and a radially extending dowel 33 engages in an axial keyway in the piston 1 to prevent piston rotation.

On brake application the hydraulic pressure in region 30 is released so that spring force F moves the piston 1 and adjuster members 7,17 to apply the brake. If the said thread clearance is taken up the cone clutch 21,25 is released, allowing the drive ring 21 to rotate on the adjuster member 7 under the action of spring 27 whereby the adjuster member 7 and thimble 17 maintain their adjusted positions.

In a modified form shown in FIG. 2 of the accompanying drawings, the cone clutch is formed in a cavity 35 in one axial end face of a piston 37 which is coaxially arranged with piston 1 in cylinder bore 3. The pistons 37,1 are connected by a peg 39 to prevent relative rotation whilst allowing relative axial movement, and with a constant quantity of hydraulic fluid present in the annular chamber 41 formed in cylinder bore 3 remote from piston 1, this modified embodiment operates in exactly the same manner as the above described embodiment of FIG. 1. However, the hydraulic pressure in chamber 41 can be increased as required to provide a backup brake release pressure. This is particularly necessary for tram and rail applications.

To replace pads or linings the adjuster may be wound back by providing an extension of the adjuster member 7, which extension is hydraulically sealed to the piston 1 and provided with a spanner fitting. Alternatively a releasable connection can be provided between the thimble 17 and spreader plate 29 to allow the thimble 17 to be turned to reset the adjuster.

The present invention thus provides a simple but efficient adjuster which is suitable for spring applied brakes.

I claim:

1. An adjuster for use in spring applied brakes comprising a thrust block which is axially slidable in a cylinder bore, the thrust block being rotatably connected to one of two screw threaded adjuster members which are interconnected by a self-sustaining thread, said one adjuster member being provided with a spiral drive thread between the thrust block and said self-sustaining thread, and an axial portion of said one adjuster member being profiled, detent means engaging said profiled portion, the profile of said portion being constructed and arranged that said detent means at all times applies a force to said profiled portion to prevent accidental rotation of said one adjuster member in either direction while allowing rotation thereof when said force is exceeded, a drive ring having a complementary thread meshing with said spiral drive thread with a predetermined amount of axial thread clearance therebetween requiring an amount of relative axial movement between the drive ring and said one adjuster member in one of two axial directions before the meshed threads on the drive ring and on said one adjuster member interengage each other, the drive ring having a tapered outer peripheral surface which can engage a complementary surface on said cylinder bore to form a cone clutch, under the action of a spring, said surfaces interengaging on brake release to cause said one adjuster member to rotate under the action of said spiral thread when said meshed threads have interengaged, said drive ring being rotatable on said spiral drive thread on brake application after said meshed threads have interengaged and the cone clutch has been released.

2. An adjuster according to claim 1, wherein said one adjuster member has an enlarged diameter portion which is rotatably secured in a cavity in the thrust block, the outer periphery of the enlarged diameter portion comprising said axial portion which is profiled to engage with said detent means.

3. An adjuster according to claim 2, wherein a thrust bearing is provided between the enlarged diameter portion of said one adjuster member and a wall of said cavity.

4. An adjuster according to claim 1, wherein the drive ring spiral thread angle and the cone clutch angle are so determined that the drive ring will rotate said one adjuster member as said one adjuster member is moved axially.

5. An adjuster according to claim 1, wherein the other screw threaded adjuster member is non-rotatably attached to a spreader plate which, in use, can engage with a friction pad assembly.

6. An adjuster according to claim 1, wherein a spring force for use in applying a brake is applied to one axial end face of the thrust block, with said one screw-threaded adjuster member being connected to the opposite axial end region of the thrust block, hydraulic pressure to release the brake being appliable to said opposite axial end region in said cylinder bore.

7. An adjuster according to claim 1, wherein the drive ring has a tapered outer periphery which can engage a complementary surface provided in a recess in an annular piston which is axially slidable within said cylinder bore, and through which said one adjuster member extends.

8. An adjuster according to claim 7, wherein said annular piston is connected to the thrust block to prevent relative rotation in the cylinder bore whilst allowing for relative axial movement.

9. An adjuster according to claim 7, wherein a fixed quantity of hydraulic fluid is provided on an axial end region of said cylinder bore remote from the thrust block, and the hydraulic pressure between the thrust block and said annular piston is varied for normal brake operation, the pressure of said fixed quantity of hydraulic fluid being varied for auxiliary brake operations.

* * * * *